United States Patent
Kim et al.

(10) Patent No.: US 6,469,764 B1
(45) Date of Patent: Oct. 22, 2002

(54) LIQUID CRYSTAL DISPLAY AND METHOD FOR MANUFACTURING THE SAME

(75) Inventors: Hyang Yul Kim; Seung Hee Lee, both of Kyoungki-do (KR)

(73) Assignee: Hyundai Display Technology Inc., Kyoungki-do (KR)

( * ) Notice: Subject to any disclaimer, the term of this patent is extended or adjusted under 35 U.S.C. 154(b) by 0 days.

(21) Appl. No.: 09/320,105

(22) Filed: May 26, 1999

(30) Foreign Application Priority Data

May 29, 1998 (KR) ............................................. 98-19609

(51) Int. Cl.[7] ..................... G02F 1/1368; G02F 1/1337; G02F 1/1343
(52) U.S. Cl. ......................... 349/141; 349/130; 349/143
(58) Field of Search ................................. 349/141, 130, 349/118, 139, 143

(56) References Cited

U.S. PATENT DOCUMENTS

| | | | |
|---|---|---|---|
| 3,836,896 A | 9/1974 | Rifkin | 340/174 |
| 3,958,155 A | 5/1976 | Bogholtz et al. | 317/101 |
| 5,734,451 A | 3/1998 | Yanagawa et al. | 349/43 |
| 5,737,051 A * | 4/1998 | Kondo et al. | 349/141 |
| 5,844,644 A | 12/1998 | Oh et al. | 349/95 |
| 5,847,687 A | 12/1998 | Hirataka et al. | 345/96 |
| 6,181,402 B1 * | 1/2001 | Shim et al. | 349/141 |
| 6,281,956 B1 * | 8/2001 | Ohmuru et al. | 349/118 |

FOREIGN PATENT DOCUMENTS

| | | |
|---|---|---|
| JP | 7-128683 | 5/1995 |
| JP | 9-269497 | 10/1997 |
| JP | 10-062788 | 3/1998 |
| JP | 10-221705 | 8/1998 |
| JP | 10-260431 | 9/1998 |
| JP | 9-269507 | 10/1998 |
| JP | 9-269508 | 10/1998 |
| JP | 10-282506 | 10/1998 |

* cited by examiner

Primary Examiner—William L. Sikes
Assistant Examiner—Viet B. Nguyen
(74) Attorney, Agent, or Firm—Ladas & Parry

(57) ABSTRACT

A liquid crystal display comprising: a lower substrate having a plurality of gate bus lines being parallel each other and data bus lines being parallel each other to define pixels together with the gate bus lines, a thin film transistor provided at each intersection of the data bus line and the gate bus line, a pixel electrode formed in the pixel and connected to the thin film transistor, and a counter electrode formed in the pixel and forming electric field together with the pixel electrode; an upper substrate opposed to the lower substrate to be separated apart; a liquid crystal layer interposed between the lower substrate and the upper substrate, and homeotropic alignment layers formed on the lower substrate and the upper substrate; wherein, the pixel is divided into a plurality of electric field-formed spaces by the counter electrode and the pixel electrode, and the electric fields formed in the respective spaces are formed as diagonal lines with respect to the gate bus lines and the data bus lines thereby making symmetries with those electric fields formed at adjacent spaces.

17 Claims, 4 Drawing Sheets

LIQUID CRYSTAL DISPLAY AND METHOD FOR MANUFACTURING THE SAME

FIELD OF THE INVENTION

The present invention generally relates to a liquid crystal display, and more particularly to a liquid crystal display capable of preventing color shift and simultaneously improving its aperture ratio and transmittance.

BACKGROUND OF THE INVENTION

A liquid crystal display device has been used in various information display terminals. The major operating system for the liquid crystal display device is the twisted nematic ("TN") and the super twisted nematic ("STN"). Though they are presently commercially used in the market, the problems of narrow viewing angle are still remained unsolved.

An In-Plane Switching ("IPS") mode liquid crystal display has been suggested to solve foregoing problems.

As described in FIG. 1, a plurality of gate bus lines 11 are formed on a lower insulating substrate 10 along an x direction shown in the drawings and the gate bus lines 11 are parallel to each other. A plurality of data bus lines 15 are formed along an y direction which is substantially perpendicular to the x direction. Therefore a sub-pixel region is defined. At this time, a pair of gate bus lines 11 and a pair of data bus lines 15 are formed for defining the sub-pixel region. The gate bus line 11 and the data bus line 15 are insulated by a gate insulating layer(not shown).

A counter electrode 12 is formed, for example in a rectangular frame shape, within a sub-pixel region and it is disposed at the same plane with the gate bus line 11.

A pixel electrode 14 is formed at each sub-pixel region where the counter electrode 12 is formed. The pixel electrode 14 is composed of a web region 14a which divides the region surrounded by the rectangular frame type counter electrode 12 with a y direction, a first flange region 14b connected to a portion of the web region 14a and simultaneously overlapped with the counter electrode 12 of the x direction, and a second flange region 14c which is parallel to the first flange region 14c and is connected to the other portion of the web region 14a. That is to say, the pixel electrode 14 seems to be the letter "I". Herein, the counter electrode 12 and the pixel electrode 14 are made of opaque metal layers. To ensure an appropriate intensity of electric field, the width of both counter and pixel electrodes is preferably 10–20 µm.

The pixel electrode 14 and the counter electrode 12 are insulated from each other by a gate insulating layer (not shown).

A thin film transistor 16 ("TFT") is disposed at the intersection of the gate bus line 11 and the data bus line 12. This TFT 16 is composed of a gate electrode being extended from the gate bus line 11, a drain electrode being extended from the data bus line 15, a source electrode being extended from the pixel electrode 14 and a channel layer 17 formed on upper of the gate electrode.

A storage capacitor Cst is disposed at the region where the counter electrode 12 and the pixel electrode 14 are overlapped.

Although not shown in FIG. 1, an upper substrate (not shown) equipped with a color filter (not shown) and a lower substrate 10 are disposed opposite to each other with a predetermined distance. Herein, the distance between the upper substrate and lower substrate is smaller than that between a region of the counter electrode toward the y direction and the web region of the pixel electrode thereby forming a parallel field which is parallel with the substrate surface. Further a liquid crystal layer (not shown) having a plurality of liquid crystal molecules is interposed between the upper substrate (not shown) and the lower substrate 10.

Also, onto the resultant structure of the lower substrate and onto an inner surface of the upper substrate are formed homogeneous alignment layers respectively. By the homogeneous alignment layer, before forming an electric field between the counter electrode 12 and the pixel electrode 14, long axes of liquid crystal molecules 19 are arranged parallel to the surface of the substrate 10. Also, by the rubbing axis of the homogeneous alignment layer, the orientation direction of the molecules 19 is decided. The R direction in the drawings is the direction of rubbing axis for the homogeneous alignment layer formed on the lower substrate 10.

A first polarizing plate (not shown) is formed on the outer surface of the lower substrate 10 and a second polarizing plate (not shown) is formed on the outer surface of the upper substrate (not shown). Herein, the first polarizing plate is disposed to make its polarizing axis to be parallel to the P direction of the FIG. 1. That means, the rubbing axis direction R and the polarizing axis direction P are parallel each other. On the other hand, the polarizing axis of the second polarizing plate is substantially perpendicular to that of the first polarizing plate.

When a scanning signal is applied to the gate bus line 11 and a display signal is applied to the data bus line 15, the TFT 16 disposed at the intersection of the gate bus line 11 and the data bus line 15 is turned on. Then the display signal of the data bus line 15 is transmitted to the pixel electrode 14 through the TFT 16. Consequently, an electric field E is generated between the counter electrode 12 where a common signal is inputted and the pixel electrode 14. At this time, the direction of electric field E is referenced as to x direction as described in the FIG. 1, it has a selected degree of angle with the rubbing axis.

Afterwards, before the electric field is not generated, the long axes of the liquid crystal molecules are arranged parallel to the substrate surface and parallel to the rubbing direction R. Therefore the light passed through the first polarizing plate and the liquid crystal layer is unable to pass the second polarizing plate, the screen has dark state.

When the electric field is generated, the long axes (or optical axes) are rearranged parallel to the electric field, and therefore the incident light passed through the first polarizing plate and the liquid crystal layer passes the second polarizing plate and the screen has white state.

At that time, the direction of the long axes of the liquid crystal molecules changes according to the presence of the electric field, and the liquid crystal molecules are arranged parallel to the substrate surface. Accordingly, a viewer can see the long axes of liquid crystal molecules at all points in the screen, and the viewing angle characteristic is improved.

However, the IPS mode liquid crystal display as described above also includes following problems.

As well known, the refractive anisotropy (or birefringence, $\Delta n$) is occurred due to the difference in the lengths of the long and the short axes of the liquid crystal molecules. The refractive anisotropy $\Delta n$ is also varied from the viewer's viewing directions. Therefore a predetermined color is appeared on the region where the polar angle is of 0 degree and the azimuth angle range of degrees 0, 90, 180 and 270 in spite of the white state. This regards as color shift and more detailed description thereof is attached with reference to the equation 1.

$$T \approx T_0 \sin^2(2\chi) \cdot \sin^2(\pi \cdot \Delta n d/\lambda) \quad \text{equation 1}$$

wherein,

T: transmittance;

$T_0$: transmittance to the reference light;

$\chi$: angle between an optical axis of liquid crystal molecule and a polarizing axis of the polarizing plate;

$\Delta n$: birefringence;

d: distance or gap between the upper and lower substrates (thickness of the liquid crystal layer); and $\lambda$: wavelength of the incident light.

So as to obtain the maximum transmittance T, the $\chi$ should be $\pi/4$ or the $\Delta n d/\lambda$ should be $\pi/2$ according to the equation 1. As the $\Delta n d$ varies with the birefringence difference of the liquid crystal molecules depending on viewing directions, the value of $\lambda$ is varied in order to make $\Delta n d/\lambda$ to be $\pi/2$. According to this condition, the color corresponding to the varied wavelength $\lambda$ appears.

Accordingly, as the value of $\Delta n$ relatively decreases at the viewing directions "a" and "c" toward the short axes of the liquid crystal molecules, the wavelength of the incident light for obtaining the maximum transmittance relatively decreases. Consequently a blue color having shorter wavelength than a white color can be shown.

On the other hand, as the value of $\Delta n$ relatively increases at the viewing directions "b" and "d" toward the short axes of the liquid crystal molecules, the wavelength of incident light relatively increases. Consequently a yellow color having a longer wavelength than the white color can be shown.

Deterioration is caused in the resolution of IPS mode liquid crystal displays.

There has been proposed a method employing many times of rubbing processes for preventing the color shift. However, the many times of rubbing processes incur troublesome processes, such as many times of photolithography and the alignment layer may be damaged.

SUMMARY OF THE INVENTION

It is one object of the present invention to provide a liquid crystal display capable of improving its picture quality.

It is another object of the present invention to provide a liquid crystal display having a multi-domain which is capable of manufacturing by a simplified process, excluding many times of rubbing processes.

So as to accomplish the objects, the present invention provides a liquid crystal display comprising:

a lower substrate having a plurality of gate bus lines being parallel each other and data bus lines being parallel each other to define pixels together with the gate bus lines, a thin film transistor provided at each intersection of the data bus line and the gate bus line, a pixel electrode formed in the pixel and connected to the thin film transistor, and a counter electrode formed in the pixel and forming electric field together with the pixel electrode;

an upper substrate opposed to the lower substrate to be separated apart;

a liquid crystal layer interposed between the lower substrate and the upper substrate, the liquid crystal layer including a plurality of liquid crystal molecules; and homeotropic alignment layers formed between the lower substrate and the liquid crystal layer, between the liquid crystal layer and the upper substrate respectively;

wherein, the pixel is divided into a plurality of electric field-formed spaces by the counter electrode and the pixel electrode, and the electric fields formed in the respective spaces are formed as diagonal lines with respect to the gate bus lines and the data bus lines thereby making symmetries with those electric fields formed at adjacent spaces.

Further, the present invention provides a liquid crystal display comprising:

a lower substrate having a plurality of gate bus lines being parallel each other and data bus lines being parallel each other to define pixels together with the gate bus lines, a thin film transistor provided at each intersection of the data bus line and the gate bus line, a pixel electrode formed in the pixel and connected to the thin film transistor, and a counter electrode formed in the pixel and forming electric field together with the pixel electrode;

an upper substrate opposed to the lower substrate to be separated apart;

a liquid crystal layer interposed between the lower substrate and the upper substrate, the liquid crystal layer including a plurality of liquid crystal molecules; and homeotropic alignment layers formed between the lower substrate and the liquid crystal layer, between the liquid crystal layer and the upper substrate respectively;

wherein, the counter electrode comprises: a first electrode of a rectangular frame shape; and at least a second electrode being parallel to the gate bus lines and dividing a space surrounded by the first electrode, wherein the pixel electrode comprises: a first branch dividing the space surrounded by the first electrode in a direction crossing the second electrode; and a second branch crossing the first branch and interposed between a selected portion of the first electrode being parallel to the gate bus lines and the second electrode, wherein the pixel is divided into a plurality of electric field-formed spaces by the counter electrode and the pixel electrode, the electric fields formed in the respective spaces are formed as diagonal lines with respect to the gate bus lines and the data bus lines thereby making symmetries with those electric fields formed at adjacent spaces.

The present invention also provides a liquid crystal display comprising:

a lower substrate having a plurality of gate bus lines being parallel each other and data bus lines being parallel each other to define pixels together with the gate bus lines, a thin film transistor provided at each intersection of the data bus line and the gate bus line, a pixel electrode formed in the pixel and connected to the thin film transistor, and a counter electrode formed in the pixel and forming electric field together with the pixel electrode;

an upper substrate opposed to the lower substrate to be separated apart;

a liquid crystal layer interposed between the lower substrate and the upper substrate, the liquid crystal layer including a plurality of liquid crystal molecules;

homeotropic alignment layers formed between the lower substrate and the liquid crystal layer, between the liquid crystal layer and the upper substrate respectively;

a polarizer disposed at an outer surface of the lower substrate wherein its polarizing axis is parallel to the gate bus lines or the data bus lines;

an analyzer disposed at an outer surface of the upper substrate wherein its absorbing axis is crossed with the polarizing axis; and a phase compensating film having negative refractive anisotropy interposed between the upper substrate and the analyzer, wherein, the counter electrode comprises: a first electrode of a rectangular frame shape; and at least a second electrode being parallel to the gate bus lines and dividing a space surrounded by the first electrode, wherein the pixel electrode comprises: a first branch dividing the space surrounded by the first electrode in a direction crossing the second electrode; and a second branch crossing the first branch and interposed between a selected portion of the first electrode being parallel to the gate bus lines and the second electrode, wherein the pixel is divided into a plurality of electric field-formed spaces by the counter electrode and the pixel electrode, the electric fields formed in the respective spaces are formed as diagonal lines with respect to the gate bus lines and the data bus lines thereby making symmetries with those electric fields formed at adjacent spaces.

In another aspect, the present invention provides a method of manufacturing liquid crystal display comprising the steps of:

depositing a metal layer on a lower substrate;

forming a counter electrode by patterning a selected portion of the metal layer, the counter electrode comprising a gate bus line extended in an x direction, a first electrode of a rectangular frame shape, a second electrode disposed in the x direction and dividing a space surrounded by the first electrode;

forming a gate insulating layer on the lower substrate in which the gate bus line and the counter electrode are formed;

depositing another metal layer on the gate insulating layer;

forming a pixel electrode by patterning a selected portion of the metal layer, the pixel electrode comprising a data bus line crossing the gate bus line, a first branch dividing the space surrounded by the first electrode in a direction crossing the second electrode of the counter electrode, a second branch crossing the first branch and interposed between a portion of the first electrode being parallel to the gate bus line and the second electrode;

forming a homeotropic alignment layer on the upper substrate;

preparing an upper substrate to be attached to the lower substrate;

forming a homeotropic alignment layer on the upper substrate structure;

attaching the lower substrate and the upper substrate so that the homeotropic alignment layers are opposed to be spaced apart; and injecting liquid crystal between the lower substrate and the upper substrate.

In the presence of electric field, without performing the rubbing step at the alignment layers, there is formed a multi-domain within the pixel since at least one electric field in the diagonal shape is formed within the pixel according to the polarizing axis and the absorbing axis.

Accordingly, damages raised by rubbing the alignment layers are prevented since the present invention excludes the rubbing steps, thereby simplifying the manufacturing process. Further, there is formed a multi-domain and the color shift is not occurred.

Moreover, the polarizing axis of the polarizer is arranged in the directions of 90°, 180° where the user mainly observes, therefore the contrast in the directions of 90°, 180° can be remarkably improved.

DETAIL DESCRIPTION OF THE PREFERRED EMBODIMENT

Figure 1:
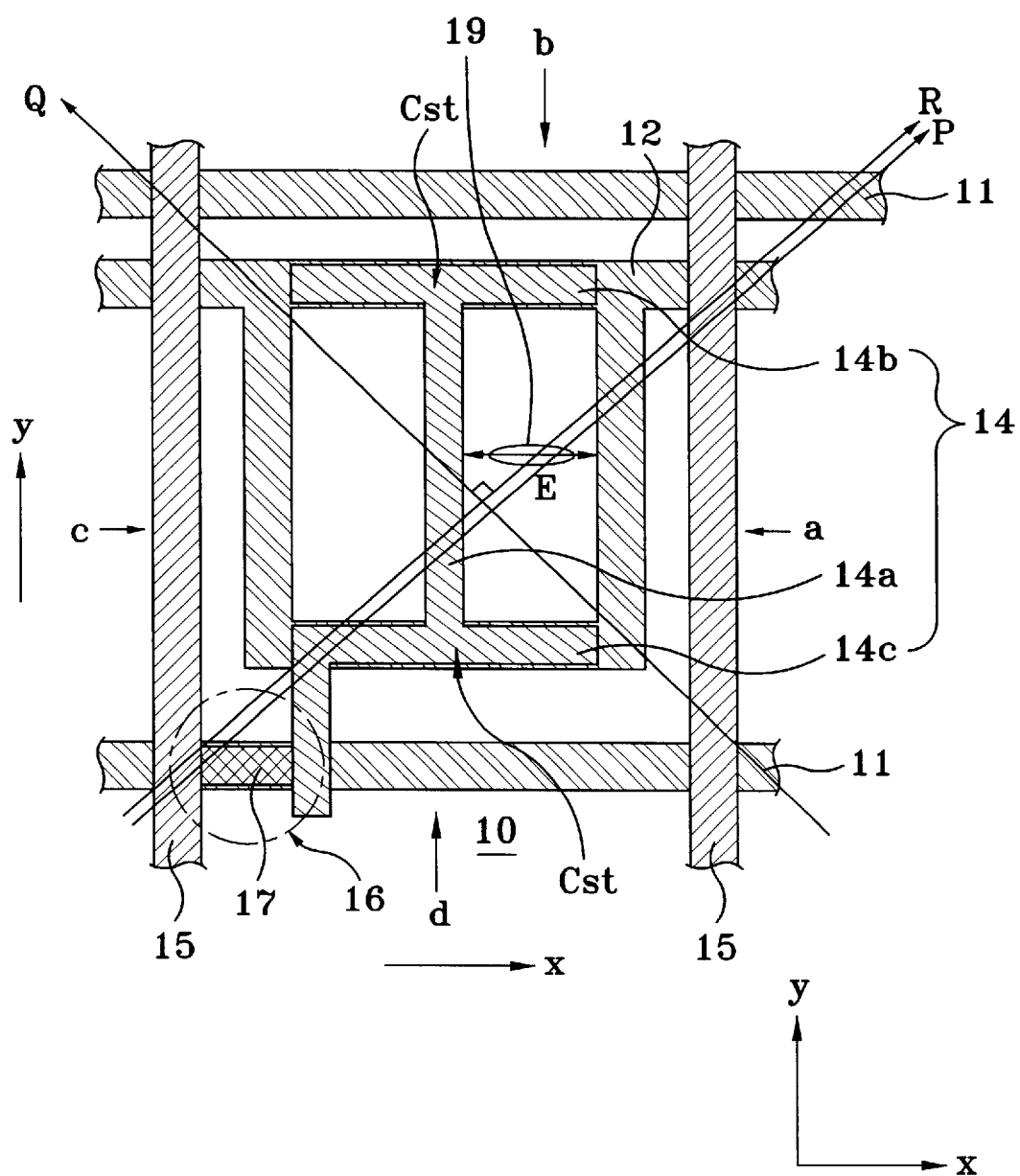
FIG. 1 is a cross-sectional view showing a lower substrate in a conventional IPS mode liquid crystal display.
Figure 2:
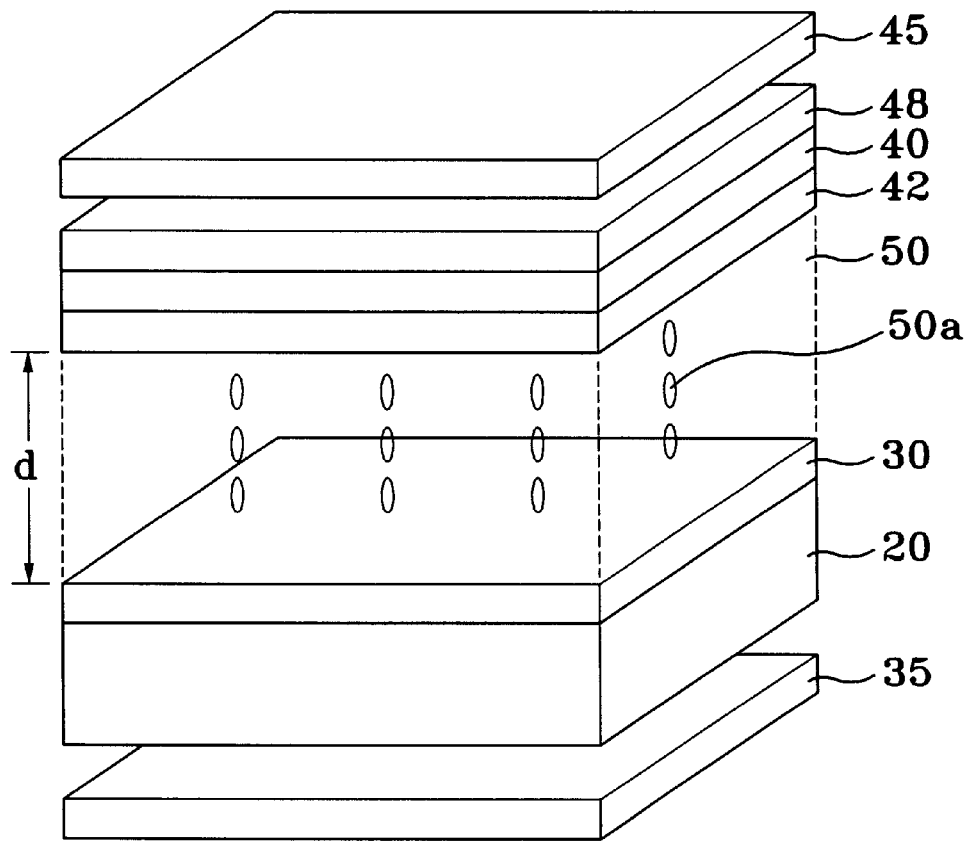
FIG. 2 is a perspective view showing a liquid crystal display having a multi-domain according to the present invention.
Figure 3:
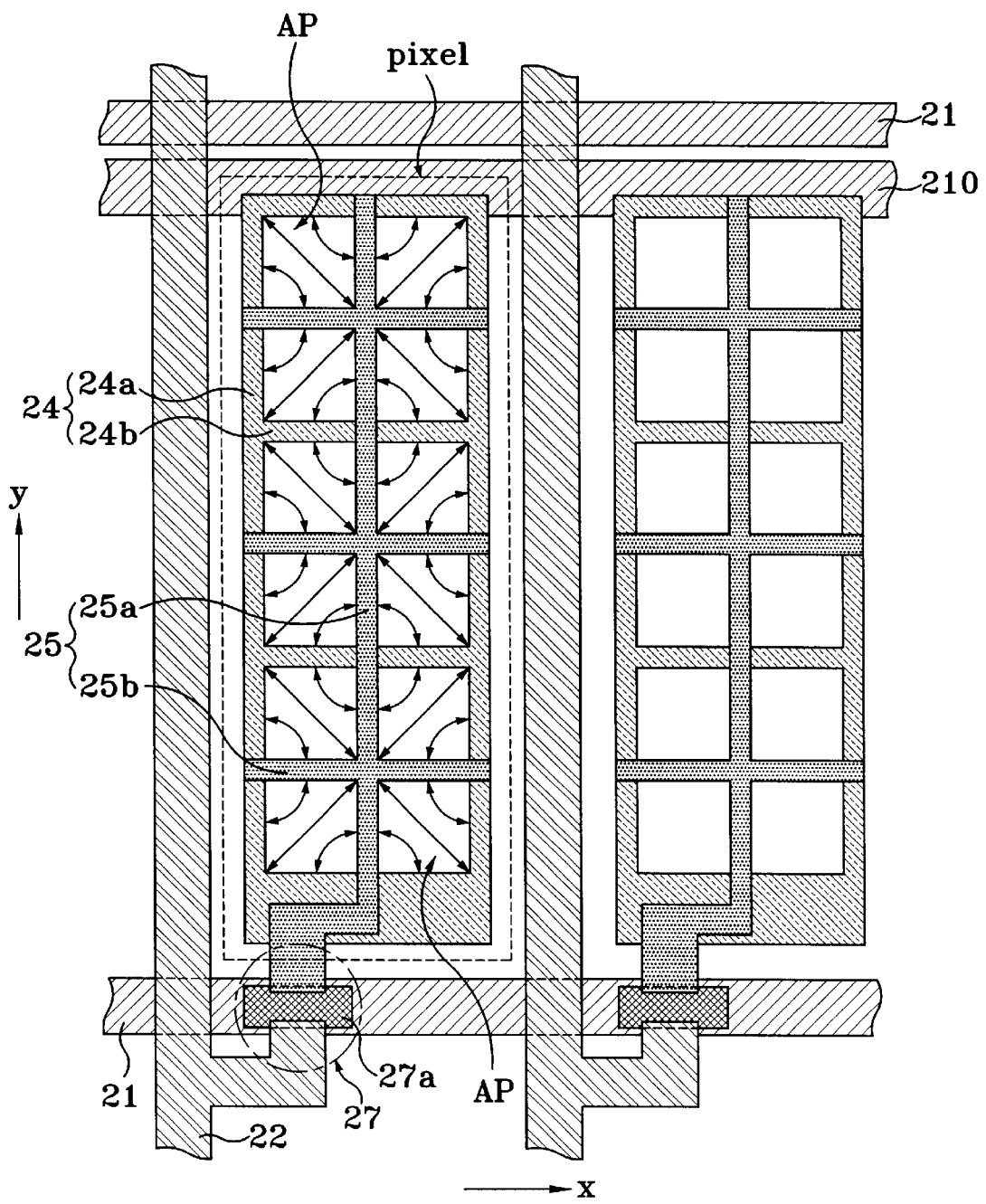
FIG. 3 is a plan view showing a lower substrate in a liquid crystal display having a multi-domain according to the present invention.
Figure 4:
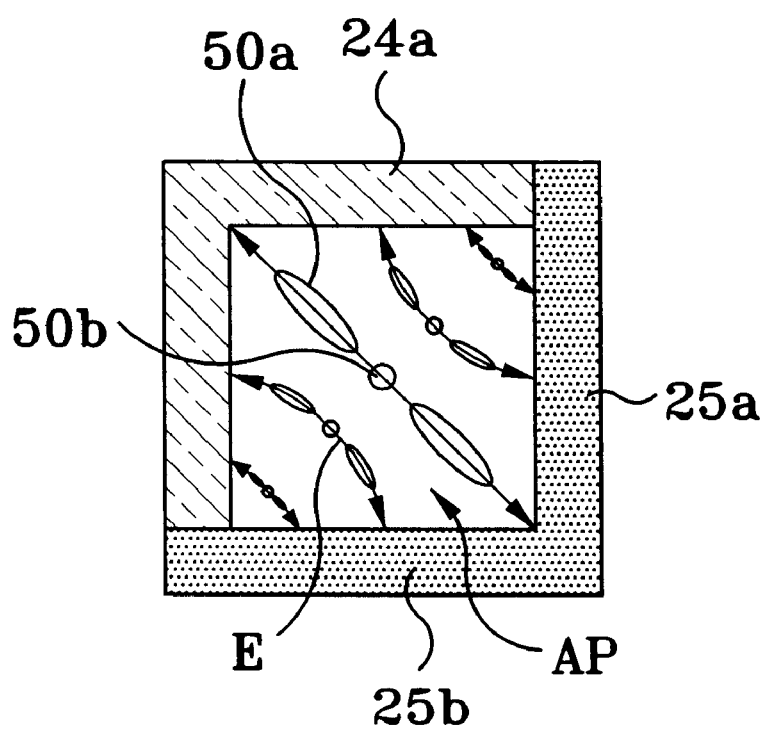
FIG. 4 is an extended view showing an aperture region in FIG. 3.

FIG. 2 is a perspective view showing a liquid crystal display having a multi-domain according to the present invention. FIG. 3 is a plan view showing a lower substrate in a liquid crystal display having a multi-domain according to the present invention. FIG. 4 is an extended view showing an aperture region in FIG. 3.

Referring to FIGS. 2 to 3, a lower substrate 20 and an upper substrate 40 are opposed to be spaced apart. Both substrates 20,40 are insulating substrates made of transparent material. A liquid crystal layer 50 including a plurality of liquid crystal molecules 50a is interposed between the lower substrate 20 and the upper substrate 40. Herein, the liquid crystal molecules 50a in the liquid crystal layer 50 are bar type molecules having a refractive anisotropy Δn. As for the liquid crystal molecules, both materials of positive and negative dielectric anisotropy Δε can be used selectively. In the present embodiment, the material of positive dielectric anisotropy is used. A thickness of the liquid crystal layer 50, i.e. a distance between the lower substrate and the upper substrate, which is called as cell gap d is in the range of 3.8~4.2 μm. A product of the refractive anisotropy Δn of the liquid crystal molecules 50a and the cell gap d, the thickness of the liquid crystal layer 50 is in the range of 0.2~0.6 μm and more preferably in the range of 0.27~0.38 μm.

As shown in FIG. 3, on upper portions of the lower substrate 20, a plurality of gate bus lines 21 extended in an x direction and a plurality of data bus lines 22 extended in a y direction are arranged alternatively in a matrix configuration thereby defining sub-pixels PIX.

A pair of gate bus lines 21 and a pair of data bus lines 22 are only shown in the drawing. Herein, an insulating layer (not shown) is interposed between the gate bus line 21 and the data bus line 22 and the insulating layer insulates therebetween.

A counter electrode 24 is disposed within the sub-pixel region PIX. Herein, the counter electrode 24 includes a first electrode 24a shaped of a rectangular frame, and a second electrode 24b dividing a space surrounded by the first electrode 24a into a selected number of spaces. Herein, the first electrode 24a is separated from the gate bus line 21 and the data bus line 22. The second electrode 24b is extended in the x direction and a selected number of second electrodes, for example two second electrodes 24b are disposed within the first electrode 24a. According to the second electrode 24b as arranged above, the space surrounded by the first electrode 24a is divided into three parts. At this time, counter electrodes 24 within the respective sub-pixels are connected by a common signal line 210. The common signal line 210 is made of opaque metal having a high conductivity.

A pixel electrode 25 is disposed within the sub-pixel region where the counter electrode 24 is formed. The pixel electrode 25 includes a first branch 25a of the y direction dividing the space surrounded by the first electrode 24a of the counter electrode 24, and a second branch 25b of the x direction crossing the first branch 25a and being disposed between the first electrode 24a of the x direction and the second electrode 24b.

Herein, the space surrounded by the first electrode 24a is divided into a selected number of aperture regions AP, for example 12 regions by the first branch 25a and the second branch 25b of the pixel electrode 25. Herein, the aperture region AP is shaped of a square so as to realize the maximum transmittance.

A TFT 27 is formed at an intersection of the gate bus line 21 and the data bus line 22. Herein, as known in the art, the TFT 27 transmits a signal applied to the data bus line 22 to the pixel electrode 25 when its corresponding gate bus line 21 is selected. At this time, the gate bus line 21 becomes a gate electrode for the TFT 27 and a region extended from the data bus line 22 becomes a source electrode, and a region extended from the pixel electrode 25 becomes a source electrode. The source and drain electrodes are overlapped with a selected portion of a channel layer 27a formed on the gate electrode 24 respectively.

On the respective inner surfaces of the lower substrate 20 and the upper substrate 40, homeotropic alignment layers 30,42 are disposed for aligning the liquid crystal molecules 50a initially. Herein, no rubbing process is required at the homeotropic alignment layers 30,42 for determining the direction of long axes of liquid crystal molecules 50a. In the homeotropic alignment layers 30,42 and long axes of the liquid crystal molecules 50a generally make an angle of almost 90° with the surfaces of both substrates 20,40 in the absence of electric field.

A polarizer 35 for polarizing an incident light from a bottom of the lower substrate 20 is disposed at an outer surface of the lower substrate 20, and an analyzer 45 for polarizing the light passed through the liquid crystal layer 50 is disposed at an outer surface of the upper substrate 40.

Herein, a polarizing axis of the polarizer 35 is in the x direction or in the y direction and an absorbing axis of the analyzer 45 is perpendicular to the polarizing axis.

Furthermore, a phase compensating film 48 is interposed between the upper substrate 40 and the analyzer 45 so that the refractive anisotropy Δn of liquid crystal molecules is compensated. The phase compensating film 48 assists to obtain a complete dark state in all points in the screen in the absence of electric field. Herein, the phase compensating film 48 comprises liquid crystal molecules of negative dielectric anisotropy, a product of refractive anisotropy of the liquid crystal molecules and a thickness of the phase compensating film 48 is equal to a product of the refractive anisotropy of the liquid crystal molecules 50a and the cell gap d.

Operation of the liquid crystal display as described above, will be followed.

When the gate bus line 21 is not selected, the TFT 27 is not turned on and therefore a signal of the data bus line 22 is not transmitted to the pixel electrode 25. Accordingly, there is no voltage difference between the pixel electrode 25 and the counter electrode 24 and no electric field is formed therebetween. Then, long axes of the liquid crystal molecules 50a are aligned vertical to the substrates 20,40 only under the influence of the homeotropic alignment layers 30,42.

Next, the light incident from the bottom of the lower substrate 20 to the polarizer 35 maintains the polarizing state of the polarizer 35 while passing the liquid crystal layer 50. Consequently, the light passing through liquid crystal layer 50 can not pass the analyzer 45 having the absorbing axis perpendicular to the polarizing axis of the polarizer 35. The screen shows the dark state. Herein, according to the influence of the phase compensating film 48, it seems the liquid crystal molecules 50a of bar type to be isotropic and the complete dark state is shown in all points in the screen.

In the meantime, when the gate bus line 21 is selected, its corresponding TFT 27 is turned on and the signal of the data bus line 22 is transmitted to the pixel electrode 25. Therefore, there is a selected degree of voltage difference between the pixel electrode 25 and the counter electrode 24, and an electric field E is formed. The electric field E of the present embodiment as shown in FIG. 4, is formed between adjacent electrodes. That is to say, the electric field E is formed at corner regions where adjacent two electrodes meet and the electric field E(or its projection face) is formed as a diagonal line with respect to the x direction and the y direction. More preferably, the electric field E (or its projection face) makes an angle of 45° with the x direction and the y direction respectively thereby obtaining the maximum transmittance. As described, the electric field formed at said corner regions is referred to effective field.

Moreover, the electrodes 24,25 are arranged to make symmetries in upper and lower positions and in left and right sides with respect to the first branch 25a and the second branch 25b. Consequently, the electric fields are also arranged to make symmetries in upper and lower positions and in left and right sides. When the user observes in front of the screen, in the present embodiment, there are formed electric field of a figure of "X" within the sub-pixel region.

After those electric fields are formed, the liquid crystal molecules 50a being arranged perpendicularly are tilted so that their long axes(or short axes) are arranged parallel to the electric fields. At this time, liquid crystal molecules 50b in the centers of the electric fields are affected by both sided liquid crystal molecules 50a having the same intensity in opposite directions. Therefore, they maintain their initial vertical alignment. Additionally, the liquid crystal molecules formed at surfaces of alignment layers 30,42 also maintain their initial state according to the van der Waals forces. Short axes of the liquid crystal molecules 50b in the center of the electric field, are coincided with the polarizing axis, and there is no light leakage thereby occurring disclination lines in the screen. Herein, the disclination lines act to set up border lines between domains, i.e. groups of liquid crystal molecules aligned in the same direction. The disclination lines are in the inverse proportion to the voltage.

When the liquid crystal molecules 50a are arranged according to the electric field E as described above, long axes of the liquid crystal molecules(or those in their projection faces) have 45° with the polarizing axis of the polarizer 35 thereby obtaining the maximum transmittance and leaking the light. The screen shows white state.

At this time, electric fields of two directions are formed within a sub-pixel and two domains are formed in the respective aperture regions.

Therefore, a multi-domain is formed in the sub-pixel region. Consequently, in the white state, the long and short axes of the liquid crystal molecules are shown at all points in the screen simultaneously, thereby preventing color shift.

The characteristic of response time is improved since the present invention employs the principle of vertical alignment rather than the conventional in-plane switching theory.

Method of manufacturing the liquid crystal display as constituted above will be discussed hereinafter.

As shown in FIG. 3, a metal layer is deposited on the lower substrate 20. As for the metal layer, Cr, Al, Mo, or MoW can be selected. A selected portion of the metal layer is patterned thereby forming the gate bus line 21, the counter electrode 24 and the common electrode line 210. Herein, the gate bus line 21 and the common electrode line 210 are patterned to be extended in the x direction, and the counter electrode 24 including the first electrode 24a in the shape of a rectangular frame and the second electrode 24b of bar type is patterned.

Afterward, the gate insulating layer (not shown) is formed on the lower substrate 20 in which the gate bus line 21 and the counter electrode 24 are formed.

Next, amorphous silicon or polysilicon is deposited on the gate insulating layer and is patterned to be disposed at a selected portion of the gate bus line 21 thereby forming the channel layer 27a.

Thereafter, another metal layer is formed on the gate insulating layer in which the channel layer 27a is formed. At this time, similar to the gate bus line 21, the metal layer is made of a material such as Cr, Mo, Al, or Mo/Al/Mo depositing layer. A selected portion of the metal layer is patterned thereby forming the data bus line 21 and the pixel electrode 25 as described above.

The homeotropic alignment layer 30 is formed on the resultant structure. No rubbing step is performed after the homeotropic alignment layer 30 is coated.

Next, the upper substrate 40 is provided. Although not shown in the drawings, the color filter is formed on the upper substrate 40, and the homeotropic alignment layer 42 is also coated on the color filter. Also, no rubbing step is performed at the homeotropic alignment layer 42.

The lower substrate 20 and the upper substrate 40 are attached such that the homeotropic alignment layers 30,42 are opposed to be spaced apart. Afterward, liquid crystal is injected between the lower substrate 20 and the upper substrate 40.

The phase compensating film 48 is attached to the outer surface of the upper substrate 40, the polarizer 35 is attached to the outer surface of the lower substrate 20 and the analyzer 45 is attached to the outer surface of the phase compensating film 48. Herein, the polarizing axis of the polarizer 35 is in the direction of the gate bus line 21 or the data bus line 22 and the absorbing axis of the analyzer 45 is perpendicular to the polarizing axis of the polarizer 35.

According to the foregoing manufacturing steps, no rubbing step is added after the alignment layers 30,42 are coated thereby simplifying the manufacturing process.

According to the present invention as described in detail, the multi-domain is formed within the sub-pixel when the electric field is formed therein.

Accordingly, damages raised by rubbing the alignment layers are prevented since the present invention excludes the rubbing steps, thereby simplifying the manufacturing process. Further, there is formed a multi-domain and the color shift is not occurred.

Moreover, the polarizing axis of the polarizer is arranged in the directions of 90°, 180° where the user mainly observes, therefore the contrast in the directions of 90°, 180° can be remarkably improved.

Various other modifications will be apparent to and can be readily made by those skilled in the art without departing from the scope and spirit of the present invention.

What is claimed is:

1. A liquid crystal display comprising:

a lower substrate having a plurality of gate bus lines being parallel each other and data bus lines being parallel each other to define pixels together with the gate bus lines, a thin film transistor provided at each intersection of the data bus line and the gate bus line, a pixel electrode formed in the pixel and connected to the thin film transistor, and a counter electrode formed in the pixel and forming electric field together with the pixel electrode;

an upper substrate opposed to the lower substrate to be separated apart;

a liquid crystal layer interposed between the lower substrate and the upper substrate, the liquid crystal layer including a plurality of liquid crystal molecules; and homeotropic alignment layers formed between the lower substrate and the liquid crystal layer, between the liquid crystal layer and the upper substrate respectively;

wherein the counter electrode comprises: a first electrode of a rectangular frame shape; and at least a second electrode being parallel to the gate bus lines and dividing a space surrounded by the first electrode, wherein the pixel electrode comprises: a first branch dividing the space surrounded by the first electrode in a direction crossing the second electrode; and a second branch crossing the first branch and interposed between a selected portion of the first electrode being parallel to the gate bus lines and the second electrode, wherein the space surrounded by the first electrode of the counter electrode is divided into electric field-formed spaces in the same direction according to the second electrode, the first branch and the second branch;

wherein two second electrodes are used for the second electrode of the counter electrode and three second branches are used for the second branch of the pixel electrode wherein, the pixel is divided into a plurality of electric field-formed spaces by the counter electrode and the pixel electrode, and the electric fields formed in the respective spaces are formed as diagonal lines with respect to the gate bus lines and the data bus lines thereby making symmetries with those electric fields formed at adjacent spaces.

2. The liquid crystal display of claim 1, further comprising a polarizer disposed at an outer surface of the lower substrate and an analyzer disposed at an outer surface of the upper substrate, wherein a polarizing axis of the polarizer is crossed with an absorbing axis of the analyzer.

3. The liquid crystal display of claim 2, wherein the polarizing axis is parallel to the gate bus lines or the data bus lines.

4. The liquid crystal display of claim 3, further comprising a phase compensating film having negative refractive anisotropy interposed between the analyzer and the upper substrate.

5. The liquid crystal display of claim 4, wherein a product of thickness and refractive anisotropy of the phase compensating film is equal to a product of thickness and refractive anisotropy of the liquid crystal molecules of the liquid crystal layer.

6. The liquid crystal display of claim 5, wherein the product of thickness and refractive anisotropy of the liquid crystal molecules of the liquid crystal layer is in the range of 0.2~0.6 $\mu$m.

7. A liquid crystal display comprising:
a lower substrate having a plurality of gate bus lines being parallel each other and data bus lines being parallel each other to define pixels together with the gate bus lines, a thin film transistor provided at each intersection of the data bus line and the gate bus line, a pixel electrode formed in the pixel and connected to the thin film transistor, and a counter electrode formed in the pixel and forming electric field together with the pixel electrode;
an upper substrate opposed to the lower substrate to be separated apart;
a liquid crystal layer interposed between the lower substrate and the upper substrate, the liquid crystal layer including a plurality of liquid crystal molecules; and
homeotropic alignment layers formed between the lower substrate and the liquid crystal layer, between the liquid crystal layer and the upper substrate respectively;
wherein, the counter electrode comprises: a first electrode of a rectangular frame shape, and at least a second electrode being parallel to the gate bus lines and dividing a space surrounded by the first electrode,
wherein the pixel electrode comprises: a first branch dividing the space surrounded by the first electrode in a direction crossing the second electrode; and a second branch crossing the first branch and interposed between a selected portion of the first electrode being parallel to the gate bus lines and the second electrode,
wherein two second electrodes are used for the second electrode of the counter electrode and three second branches are used for the second branch of the pixel electrode,
wherein the pixel is divided into a plurality of electric field-formed spaces by the counter electrode and the pixel electrode, the electric fields formed in the respective spaces are formed as diagonal lines with respect to the gate bus lines and the data bus lines thereby making symmetries with those electric fields formed at adjacent spaces.

8. The liquid crystal display of claim 7, further comprising a polarizer disposed at an outer surface of the lower substrate and an analyzer disposed at an outer surface of the upper substrate, wherein a polarizing axis of the polarizer is crossed with an absorbing axis of the analyzer.

9. The liquid crystal display of claim 8, wherein the polarizing axis is parallel to the gate bus lines or the data bus lines.

10. The liquid crystal display of claim 9, further comprising a phase compensating film having negative refractive anisotropy interposed between the analyzer and the upper substrate.

11. The liquid crystal display of claim 10, wherein a product of thickness and refractive anisotropy of the phase compensating film is equal to a product of thickness and refractive anisotropy of the liquid crystal molecules of the liquid crystal layer.

12. The liquid crystal display of claim 11, wherein the product of thickness and refractive anisotropy of the liquid crystal molecules of the liquid crystal layer is in the range of 0.2~0.6 μm.

13. A liquid crystal display comprising:
a lower substrate having a plurality of gate bus lines being parallel each other and data bus lines being parallel each other to define pixels together with the gate bus lines, a thin film transistor provided at each intersection of the data bus line and the gate bus line, a pixel electrode formed in the pixel and connected to the thin film transistor, and a counter electrode formed in the pixel and forming electric field together with the pixel electrode;
an upper substrate opposed to the lower substrate to be separated apart;
a liquid crystal layer interposed between the lower substrate and the upper substrate, the liquid crystal layer including a plurality of liquid crystal molecules;
homeotropic alignment layers formed between the lower substrate and the liquid crystal layer, between the liquid crystal layer and the upper substrate respectively;
a polarizer disposed at an outer surface of the lower substrate wherein its polarizing axis is parallel to the gate bus lines or the data bus lines;
an analyzer disposed at an outer surface of the upper substrate wherein its absorbing axis is crossed with the polarizing axis; and
a phase compensating film having negative refractive anisotropy interposed between the upper substrate and the analyzer,
wherein, the counter electrode comprises: a first electrode of a rectangular frame shape; and at least a second electrode being parallel to the gate bus lines and dividing a space surrounded by the first electrode,
wherein the pixel electrode comprises: a first branch dividing the space surrounded by the first electrode in a direction crossing the second electrode; and a second branch crossing the first branch and interposed between a selected portion of the first electrode being parallel to the gate bus lines and the second electrode,
wherein the pixel is divided into a plurality of electric field-formed spaces by the counter electrode and the pixel electrode, the electric fields formed in the respective spaces are formed as diagonal lines with respect to the gate bus lines and the data bus lines thereby making symmetries with those electric fields formed at adjacent spaces.

14. The liquid crystal display of claim 13, a product of thickness and refractive anisotropy of the phase compensating film is equal to a product of thickness and refractive anisotropy of the liquid crystal molecules of the liquid crystal layer.

15. The liquid crystal display of claim 14, wherein the product of thickness and refractive anisotropy of the liquid crystal molecules of the liquid crystal layer is in the range of 0.2~0.6 μm.

16. A method of manufacturing liquid crystal display comprising the steps of:
forming a counter electrode from a deposited metal layer on a lower substrate by patterning a selected portion of the metal layer, the counter electrode comprising a gate bus line extended in an x direction, a first electrode of a rectangular frame shape, a second electrode disposed in the x direction and dividing a space surrounded by the first electrode;
forming a gate insulating layer on the lower substrate in which the gate bus line and the counter electrode are formed;
forming a pixel electrode from a deposited metal layer on the gate insulating layer by patterning a selected portion of the metal layer, the pixel electrode comprising a data bus line crossing the gate bus line, a first branch dividing the space surrounded by the first electrode in a direction crossing the second electrode of the counter electrode, a second branch crossing the first branch and interposed between a portion of the first electrode being parallel to the gate bus line and the second electrode;

forming a homeotropic alignment layer on the upper substrate;

preparing an upper substrate to be attached to the lower substrate;

forming a homeotropic alignment layer on the upper substrate structure;

attaching the lower substrate and the upper substrate so that the homeotropic alignment layers are opposed to be spaced apart; and injecting liquid crystal between the lower substrate and the upper substrate.

17. The method of claim 16, wherein the metal layer is made of a material selected among Cr, Al, Mo, MoW.

* * * * *